Patented Jan. 13, 1948

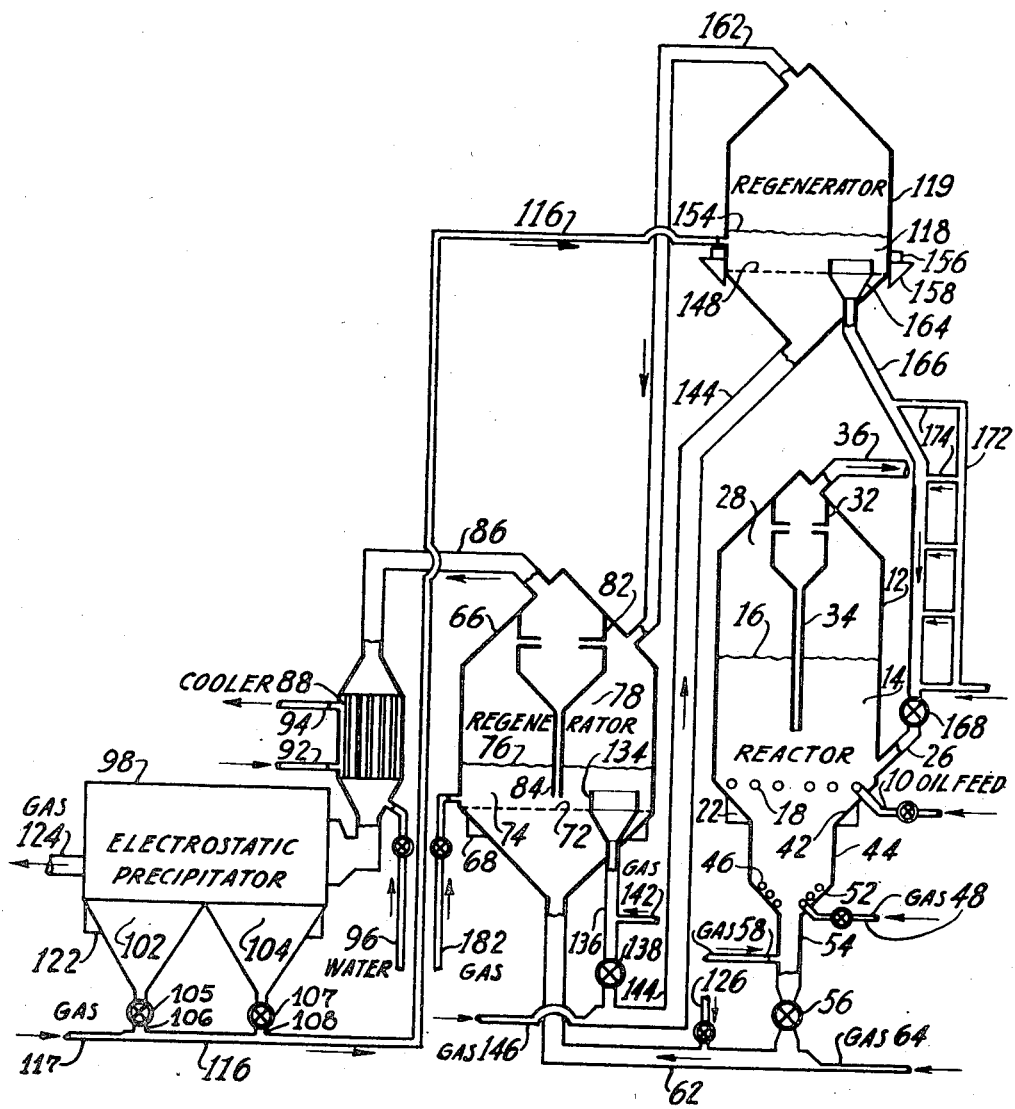

2,434,567

UNITED STATES PATENT OFFICE 2,434,567

METHOD AND APPARATUS FOR CONTACTING HYDROCARBONS WITH CATALYST PARTICLES

Charles E. Jahnig, Roselle, and Charles W. Tyson, Summit, N. J., assignors to Standard Oil Development Company, a corporation of Delaware Application January 19, 1944, Serial No. 518,840

12 Claims. (Cl. 196—52)

This invention relates to catalytic reactions using powdered catalyst or contact material, and more particularly, relates to the catalytic conversion of hydrocarbons.

The first systems using powdered catalyst for catalytic reactions are high structures requiring a large amount of structural steel. The present invention is an improvement over previous designs and the elements are so arranged to have a larger number of the parts of the system at lower levels to reduce the amount of structural steel required.

Also, according to the present invention, two regenerators of different size are used at different levels with the larger regenerator being arranged at ground level or near ground level. In addition, the electrostatic precipitator used for recovering entrained catalyst particles from regeneration gases passing to the atmosphere is located at ground level. The electrostatic precipitator is a relatively large piece of equipment and by placing it at ground level rather than at an elevated point, a saving in structural steel results.

In the drawing, the figure represents one form of apparatus for carrying out the invention.

Referring now to the drawing, the reference character 10 designates a line for conducting the reactants to the reaction vessel 12. The invention is capable of use in connection with catalytic reactions or reactions where gases or vapors are contacted with powdered contact material. The invention will be specifically described in connection with catalytic conversion of hydrocarbons but it is to be understood that the invention is not restricted thereto and the invention may be used in connection with other reactions in the petroleum field, such as dehydrogenation, alkylation, isomerization, etc., and in the oxidation, chlorination, etc. of other organic compounds.

The reaction vessel 12 is shown as partly filled with catalytic material or powdered material 14 having a level designated 16. The powdered material in the reaction vessel 12 is maintained in a dry fluidized condition by the upward passage of vapors or gases through the bed of powdered material. In the catalytic cracking of hydrocarbons the vapors may be mixed or contacted with powdered catalytic material in the reaction zone. It is also possible to use preheated liquid hydrocarbons and mix them with a sufficient amount of catalytic material raised to a temperature higher than the reaction temperature to supply heat for vaporizing the liquid oil and raising it to conversion or cracking temperature.

In the form of the invention shown in the drawing, the hydrocarbon oil feed comprises a gas oil having an A. P. I. gravity of 32°, an initial boiling point of 450° F. and a final boiling point of 950° F. The oil feed may be heated to a temperature of about 400° F. and is passed through line 10 at this temperature. The temperature may be varied from 100° F. to 500° F., depending on the amount of conversion desired, the activity of the catalyst, the characteristics of the oil, etc. The catalyst to liquid oil ratio by weight is about 10 to 1 to about 30 to 1 depending on the temperature of the oil and the catalyst, the conversion desired, etc. When using a process wherein the oil is heated to cracking or conversion temperature before being mixed with the catalyst, the catalyst to oil ratio may go as low as 1 to 1 by weight. During cracking the temperature may be from about 750° F. to 1100° F., depending on the feed stock and the amount of cracking desired. For cracking the above feed stock to obtain about 50% of gasoline by volume, a temperature of about 950° F. is selected.

The oil feed is passed through a pancake coil 18 located in the bottom portion of the reaction vessel 12. The pancake coil is provided with a large number of small openings in the upper portion of the pipe forming the coil so as to distribute the liquid oil at a large number of points to get better contact between the powdered catalyst 14 in the reaction vessel 12 and the oil feed. Other distributing means may be used. The catalyst may comprise any suitable cracking catalyst, such as acid-treated bentonites, synthetic silica alumina gels, synthetic silica magnesia gels, etc. Preferably the catalyst is used in finely divided condition as a powder having a size of about 200 to 400 mesh or finer. The liquid oil is vaporized by contacting the hot powdered catalyst 14 in the reaction vessel 12 and the velocity of the vapors is so selected that the mass of powdered material in the reaction vessel 12 assumes a dry fluidized condition and has a relatively high density.

For example, when the catalyst used is acid-treated bentonite clay in powdered form, the concentration in the reaction vessel 12 of the fluidized mixture is about 10 lbs./cu. ft. to 30 lbs./cu. ft. Supports 22 are shown for supporting the reaction vessel 12 and these supports are at or above ground level.

Hot regenerated catalyst is fed to the bottom portion of the reaction vessel 12 through line 26 directly into the fluidized mixture above the pancake coil 18. The regeneration of the catalyst particles or contact particles will be hereinafter described in greater detail. The vapors as they pass upwardly through the dense bed of catalytic material are converted to desired hydrocarbons and the reaction products in vapor form leave the bed of dense fluidized powdered catalyst 14 and pass to a less dense phase 28 in the upper portion of the reaction vessel 12. The vapors contain entrained catalyst or contact particles and these are removed by passing the vaporous reaction products through separating means 32.

The separating means 32 is arranged within the upper portion of the reaction vessel 12 and is shown in the drawing as a cyclone separator. The cyclone separator may be a "Multiclone" separator. The separated solid particles drop into the bottom of the separating means 32 and are withdrawn therefrom through a pipe 34 which dips below the surface or level 16 of the fluidized mixture of catalyst powder 14 in the reaction vessel 12. The reaction products in vapor form leave the separating means 32 through line 36 and are passed through suitable fractionating equipment or the like for separating desired products from undesired products. The fractionating system is not shown in the drawing.

During conversion of hydrocarbons there is a deposit of fouling material on the catalytic particles which requires regeneration of the particles before using them in another conversion operation. For example, in the catalytic cracking of hydrocarbons, carbonaceous material or coke is deposited on the particles and it is necessary to remove this material or coke before using the material again in a conversion operation. In a continuous process, the fouled material is continuously withdrawn and regenerated and then returned to the reaction vessel.

The reaction vessel 12 at about the level of the pancake coil 18 has a sloping portion 42 for reducing the diameter of the reaction vessel 12 in its lower portion. The fouled catalyst passes to a stripping section 44 which has a smaller diameter than the reaction vessel 12 and which is arranged below the pancake coil 18 and below the sloping side 42. A coil or plurality of pipes 46 is provided at the lower portion of the stripping section 44. These pipes or coils 46 have an inlet 48 for the introduction of stripping gas. In some instances steam may be used as a stripping gas and in other instances it is necessary to use inert gases, such as nitrogen, carbon dioxide, hydrocarbon gases, or the like.

The stripping gas is introduced directly into the stripping section 44 for direct contact with the spent powdered material. In the case of the catalytic conversion of hydrocarbons, some hydrocarbons are adsorbed on the catalyst particles and by steaming or stripping these particles the vaporous products are recovered. Also, by removing these adsorbed hydrocarbons from the catalyst particles there is less heat produced by burning in the regeneration zone.

The stripping section 44 has an inclined bottom portion 52 adjacent which the stripping coils or pipes 46 are arranged. The bottom of the stripping section empties the powdered material into a short standpipe 54 having a control valve 56 for controlling the amount of catalyst withdrawn from the standpipe 54. One or more lines 58 may be provided for introducing fluidizing gas into the standpipe 48 to maintain the powder in fluidized condition. The fluidized powdered material from the top of the valve 56 to the level 16 in the reaction zone acts as a hydrostatic head to produce pressure at the bottom of the standpipe 54. There is a pressure drop across the valve 56 so that on the lower side of the valve or on the down-stream side the pressure is less than on the up-stream side of the valve.

The generating gas is introduced into line 62 from line 64 below the control valve 56. The pressure below the valve 56 is less than above the valve as above pointed out and therefore the regenerated gas introduced through line 64 is at a lower pressure and there is no danger of the regenerating gas passing upwardly through the valve 56 to the reaction vessel 12.

The generating gas may comprise air or other oxygen-containing gas such as flue gas containing oxygen. The regenerating gas functions to burn off the coke or carbonaceous material from the spent catalyst particles. The regenerating gas also serves to decrease the density or concentration of the mixture leaving the standpipe 54 for conveying the powdered material through line 62 to the bottom of the first regeneration vessel 66. The pressure produced by the hydrostatic head above described is sufficient to pass the spent powdered catalyst into the regeneration vessel 66. The regeneration vessel 66 is supported by supporting means 68 at ground level or above ground level. The regeneration vessel 66 is provided with a bottom distribution plate 72 through which the suspension of spent catalyst and regenerating gas pass. The distribution plate functions to distribute evenly the powdered material and gas across the area of the vessel.

The velocity of regenerating gas is so selected that the catalyst particles undergoing regeneration are maintained as a bed 74 of dry fluidized particles having a level as indicated at 76. The density of the fluidized mixture in the bed 74, when using acid-treated bentonite, is about 10 lbs./cu. ft. to 30 lbs./cu. ft. The contact or catalyst particles are maintained in the regeneration vessel 66 for a limited time to remove only a part of the coke or carbonaceous material deposited on the particles in the reaction vessel 12. The partly regenerated catalyst particles are then withdrawn and passed to a second regeneration vessel which will be presently described in greater detail.

The regeneration gases pass upwardly through the bed 74 of catalytic or contact material and into the space 78 or dilute phase in the upper portion of the regeneration vessel. The regeneration gases contain entrained solid particles and these are removed by passing the regeneration gases through separating means 82. The separating means 82 is located in the upper portion of the regeneration vessel 66 and may comprise a cyclone separator, "Multiclone" separators, or the like. The separated solid particles are collected in the separating means 82 and are returned to the catalyst mixture undergoing regeneration in the regeneration vessel 66 through line 84 which dips below the level 76 of the fluidized mixture therein.

The regeneration gases leave the separating means 82 through line 86 and as these gases are relatively high temperature, they are passed through cooler or heat exchanger 88 which may be a waste heat boiler having an inlet 92 and an outlet 94. During regeneration the temperature in the regeneration zone 66 is maintained below about 1100° F., especially when using acid-treated bentonite clays. When using synthetic gels, higher regeneration temperatures may be used but the temperature should be kept below about 1175° F. The regeneration gases leave the regeneration zone 66 at about 1100° F. and are cooled to about 600° F. after passing through the cooler or waste heat boiler 88. Water is preferably injected into the regeneration gases below the cooler 88 through line 96 to reduce the temperature of the gases to about 450° F. before passing them to the electrostatic precipitator 98.

The electrostatic precipitator 98 is provided with a plurality of hoppers 102 and 104, preferably four hoppers, for receiving the separated solid particles which are separated from regeneration gases passing through the electrostatic precipitator. The hoppers are shown as having tapered sides and the powdered material is passed from the bottom of hopper 102 through star feeder 105 and line 106 and from the bottom of hopper 104 through star feeder 107 and line 108. Lines 106 and 108 feed into line 116 into which conveying gas, such as air, is introduced through line 117. The mixture is passed through line 116 and is preferably introduced into the dry fluidized bed of catalyst 118 in regenerator 119 to be described hereinafter. Instead of passing the mixture in line 116 into vessel 119, it may be passed to a separate low velocity settling zone which functions in a manner similar to vessel 119 in that the suspended solids are separated out at the low velocity. The separated solids may then be returned to a convenient point in the system by means of a standpipe of fluidized solids.

The electrostatic precipitator is a large piece of equipment, and according to this invention, is supported at ground level. Supporting means are shown at 122. In other designs, the electrostatic precipitator is arranged at a high level in order to build up standpipe pressure for returning the recovered catalyst to the system. The supporting of the electrostatic precipitator at a high level necessitated the use of a large amount of structural steel. By placing the electrostatic at ground level a much cheaper construction is afforded.

The regeneration gases freed of substantially all of the entrained catalyst leave the electrostatic precipitator through line 124 and are passed to the atmosphere. Some catalyst fines are continuously lost with the regeneration gases leaving through line 124 and it is necessary to add make-up catalyst at intervals to maintain the desired amount of catalyst circulating in the system. Make-up catalyst comprising fresh or freshly regenerated catalyst may be introduced in various parts of the system. One place of introduction is by line 126 which communicates with the line 62 leading to the regeneration vessel 66.

Referring now to the second regeneration vessel 119, the partly regenerated catalyst particles are withdrawn from the bottom of the bed 74 in the regeneration vessel 66 through funnel-shaped member 134. The upper part of this member 134 is at or above the level of the distribution plate 72. Powdered regenerated catalyst or contact material is flowed into a short standpipe 136 having a control valve 138 for controlling the rate of withdrawal of catalyst or contact particles from the regeneration vessel 66. Preferably fluidizing gas is introduced through line 142 to the standpipe 136 to maintain the catalytic or contact particles in fluidized condition. The head of fluidized particles extending from the valve 138 to the level 76 in the regeneration vessel 66 provides a hydrostatic pressure which is utilized in moving the catalyst or contact particles to the second regeneration vessel 119.

In passing through the control valve 138 there is a pressure drop and the pressure on the catalyst or contact particles in the pipe 144 below the valve 138 is less than at the bottom of the standpipe 136. Regenerating gas is introduced into line 144 through line 146 below the valve 138. The regenerating gas may comprise air or other oxygen-containing gas, such as flue gas containing some oxygen.

The less dense mixture resulting from mixing regenerating gas with the dense fluidized mixture passing from the standpipe 136 is passed through line 144 into the bottom portion of the second regeneration vessel 119 below the distribution plate 148. The distribution plate 148 is similar to that described in connection with the first regeneration vessel 66. The velocity of the regenerating gas is so controlled to maintain a fluidized bed of catalyst or contact particles 118 having a level 154. The catalyst fines from electrostatic precipitator 98 passing through line 116 are introduced into the bed 118 and into regenerator 119 which acts as a separator.

The catalyst or contact particles undergoing regeneration are maintained in the second vessel 119 for a time sufficient to complete the regeneration of the catalyst particles. The regeneration vessel 119 is much smaller than the first regeneration vessel 66 and can be supported at a higher level with less structural steel. The regenerator 119 is located at a higher level than reaction vessel 12 in order to provide a fluidized column of contact particles to produce sufficient hydrostatic pressure to recirculate the powdered material to reaction vessel 12. The second regeneration vessel 119 is provided with lugs 156 which are supported on supporting means 158 which may be part of the supporting steel structure for the unit.

The second regeneration vessel 119 is arranged above the reaction vessel 12. As above pointed out, the second regeneration vessel 119 is smaller than the regeneration vessel 66 but if only one regenerator were used, it would be about four times as large as the regeneration vessel 119, and in previous designs it was necessary to support such a large regenerator at a relatively high level.

It will be noted that the second regeneration vessel 119 does not have a separating means arranged in the top part thereof. The regeneration gases containing entrained solids pass overhead through line 162 which leads to the upper portion of the first regeneration vessel 66 so that the regeneration gases containing solid particles passing through line 162 are passed through the separating means 82 arranged in the upper part of the first regeneration vessel 66. The temperature during regeneration in the second regeneration vessel 119 is maintained below about 1100° F. when an acid-treated bentonite clay is being regenerated but temperatures as high as 1175° F. may be used when synthetic silica alumina or synthetic silica magnesia gels are used.

The regenerated catalyst particles are withdrawn from the bed of fluidized catalyst particles 118 through a funnel-shaped member 164 which is similar to the member 134 described in connection with the withdrawal pipe of the first regeneration vessel 66. The funnel-shaped member 164 communicates with a standpipe 166 provided at its lower portion with a control valve 168 for controlling the amount of regenerated catalyst particles being returned to the reaction vessel 12 through line 26 above described. The regenerated catalyst returned to reaction vessel 12 is at about 1000° F. to 1200° F. A manifold 172 is provided having branch lines 174 for introducing fluidizing gas into the standpipe 166 at spaced points along the length of the standpipe. As the pressure increases as the height of the head increases, it is preferred that gas introduced at the lower portion of the standpipe 166 will be introduced at a higher pressure than the fluidizing gas introduced into the upper portion of the standpipe 166.

The second regeneration vessel 119 acts as a separator for separating particles from gas. The amount of particles suspended in the gas leaving through line 162 is less than the amount of particles suspended in the incoming gas in line 144 because particles in the dense fluidized condition are withdrawn from bed 118 through standpipe 166.

The reaction zone or vessel 12 operates under a pressure of about 9 lbs./sq. in. so that there is sufficient pressure to carry the vaporous reaction products through line 36 and through the fractionating equipment. To return the powdered catalyst from the second regeneration vessel 119 to the reaction vessel 12, it is necessary to build up a sufficient pressure to overcome the back pressure plus the hydrostatic head in the reaction vessel 12. That is the purpose of arranging the second regeneration vessel 119 at a high level. The pressure produced by the head of fluidized material in the standpipe 166 is utilized for returning the catalyst particles to the reaction vessel 12.

Where feed stocks are used which do not deposit enough carbon on the catalyst to supply sufficient heat on regeneration to heat the catalyst particles to the desired temperature, an auxiliary burner may be used for producing hot combustion gases which may be introduced into either or both of the regeneration vessels 66 and 119. The hot combustion gases at a temperature of about 300° F. to 1200° F. may be introduced through line 64 into line 62 leading to the first regeneration vessel 66. Or the hot combustion gases may be passed through line 146 into the line 144 leading to the second regeneration vessel 119. Or the hot combustion gases may be passed through line 182 directly into the bed of fluidized solid particles undergoing regeneration as shown at 74 in the first regeneration vessel 66.

Instead of passing liquid oil or liquid oil and vapors through line 10, heated vapors may be used in which case generally less catalyst circulation is used.

The invention may be used in catalytic reactions, such as cracking, dehydrogenation, aromatization, reforming, retreating etc., and may also be used in general catalytic reactions not restricted to hydrocarbons such as oxidation, chlorination, etc.

While one form of the invention has been shown, it is to be understood that various changes and modifications may be made without departing from the spirit of the invention.

We claim:

1. An apparatus of the character described including a reaction vessel and a regeneration vessel substantially at ground level, means for introducing powdered material and a reactant into the bottom portion of said reaction vessel, a pipe connecting the bottom of said reaction vessel and the bottom of said regeneration vessel for conducting powdered material from the bottom portion of said reaction vessel to the bottom portion of said regeneration vessel, a smaller settling vessel arranged above the level of said regeneration vessel and said reaction vessel for separating powdered material from gaseous fluid, tubular means connecting the bottom portion of said smaller vessel and said regeneration vessel whereby powdered material suspended in a gaseous fluid is passed from said regeneration vessel to said smaller settling vessel wherein powdered material is separated from gaseous fluid and a standpipe connecting said smaller vessel with said reaction vessel for returning powdered material from said smaller vessel to the lower portion of said reaction vessel.

2. An apparatus of the character described including a reaction vessel, a first regeneration vessel and a second regeneration vessel, means for introducing powdered contacting material and a reactant into said reaction vessel, tubular means connecting the bottom of said reaction vessel and the bottom of first regeneration vessel, said second regeneration vessel being arranged above the level of said first regeneration vessel and arranged above said reaction vessel, tubular means connecting said regeneration vessels whereby powdered material is passed from said lower first regeneration vessel to the bottom of said second regeneration vessel and a standpipe connecting said second regeneration vessel with said reaction vessel whereby powdered material is passed from said second regeneration zone to said reaction vessel.

3. An apparatus according to claim 2 in which said second regeneration vessel is smaller than said first regeneration vessel.

4. Apparatus according to claim 2 which includes an electrical precipitator located at ground level and communicating with the upper portion of said first regeneration vessel to receive gases therefrom and recover entrained powdered material from the gases.

5. A method of carrying out catalytic reactions which comprises contacting a reactant with hot powdered catalyst in a reaction zone, withdrawing spent catalyst from the bottom of said reaction zone and passing it to the bottom of a first regeneration zone for partial regeneration, passing catalyst from the first regeneration zone to a second regeneration zone arranged above said reaction zone for further regeneration and providing a fluidized column of catalyst producing a hydrostatic pressure between said second regeneration zone and said reaction zone for passing regenerated catalyst from said second regeneration zone to said reaction zone.

6. A method of carrying out catalytic reactions which comprises contacting a reactant with hot powdered catalyst in a reaction zone, withdrawing spent catalyst from the bottom of said reaction zone and passing it to the bottom of a first regeneration zone arranged at a low level and for partial regeneration, passing catalyst from the bottom of the first regeneration zone to a second regeneration zone arranged at a higher level than said first regeneration zone and above said reaction zone and providing a fluidized column of catalyst producing hydrostatic pressure between said second regeneration zone and said reaction zone for passing regenerated catalyst from said second regeneration zone to said reaction zone.

7. A method of contacting gaseous fluid and contact particles which comprises contacting a gaseous fluid with contact particles in a contact zone, withdrawing particles from the bottom of said contact zone and passing them to the bottom of a first regeneration zone arranged at a low level, passing contact particles from the bottom of said first regeneration zone to a second regeneration zone arranged at a higher level and above said contact zone and providing a fluidized column of contact particles between said second regeneration zone and said contact zone to produce a hydrostatic pressure for passing the contact particles to said contact zone.

8. An apparatus of the character described including a reaction vessel and a regeneration vessel substantially at ground level, means for introducing powdered material and a reactant into said reaction vessel, tubular means connecting said reaction vessel and said regeneration vessel, a smaller settling vessel arranged above the leevl of said regeneration vessel and said reaction vessel for separating powdered material from gaseous fluid, tubular means connecting said smaller vessel and the bottom portion of said regeneration vessel whereby powdered material suspended in a gaseous fluid is passed from said regeneration vessel to said smaller settling vessel wherein powdered material is separated from gaseous fluid, and a standpipe connecting said smaller vessel with said reaction vessel for returning powdered material from said smaller vessel to said reaction vessel.

9. A method of carrying out catalytic reactions which comprises contacting a reactant with hot powdered catalyst in a reaction zone, withdrawing spent catalyst from said reaction zone and passing it to a first regeneration zone arranged at a low level and for partial regeneration, passing catalyst from the first regeneration zone to a second regeneration zone arranged at a higher level than said first regeneration zone and above said reaction zone, passing gas from said first regeneration zone to a separating step to separate entrained catalyst from the gas, returning the separated catalyst to said first regeneration zone, passing the gas leaving said second regeneration zone to said separating step to recover entrained catalyst from the gas, returning the last mentioned recovered catalyst to said first regeneration zone and providing a fluidized column of catalyst producing hydrostatic pressure between said second regeneration zone and said reaction zone for passing regenerated catalyst from said second regeneration zone to said reaction zone.

10. An apparatus of the character described including a reaction vessel and a regeneration vessel, means for introducing powdered material and a reactant into said reaction vessel, means for introducing regenerating gas and fouled powdered material to said regeneration vessel, fluid-conducting means connecting the bottom of said reaction vessel and the bottom of said regeneration vessel, said regeneration vessel being provided with a perforated distribution plate in its lower portion through which the regenerating gas and particles of powdered material to be regenerated are passed and means for withdrawing regenerated particles from said regeneration vessel and passing them to said reaction vessel, an electrostatic precipitator, fluid-conducting means connecting the top of said regeneration vessel with said electrostatic precipitator for passing regeneration gas containing entrained particles to said precipitator wherein entrained particles are separated, means for mixing regenerating gas directly with the separated particles from said electrostatic precipitator unmixed with particles from any other source and for passing the mixture to said regeneration vessel above and adjacent to said distribution plate.

11. A method of contacting hydrocarbons with catalyst particles which comprises contacting hydrocarbon vapors with catalyst particles in a contact zone, selecting the velocity of the hydrocarbon vapors to maintain the particles as a dense fluidized bed in said contact zone, withdrawing fouled catalyst particles from the bottom portion of said contact zone, mixing regenerating gas with the withdrawn fouled catalyst particles and passing the mixture to a regeneration zone wherein the particles are at least partially regenerated before being returned to said contact zone, selecting the velocity of the regenerating gas to maintain the particles as a dense fluidized bed in said regeneration zone, withdrawing regenerated particles as a dense fluidized mixture from the bottom portion of the dense fluidized bed in said regeneration zone and passing them to said contact zone, removing regeneration gases containing entrained particles overhead from said regeneration zone, passing the removed regeneration gases first to a separation step to recover some of the entrained particles and then to an electrostatic precipitation step to separate and recover the fine particles from the regeneration gases, mixing regenerating gas with the separated and recovered fine particles from said electrostatic precipitation step unmixed with particles recovered in said first separation step and passing the resulting mixture to the bed of fluidized particles in said regeneration zone below the level of the bed so that the fluidized bed acts to separate particles from the mixture.

12. A method of contacting hydrocarbons with catalyst particles which comprises contacting hydrocarbon vapors with catalyst particles in a contact zone, selecting the velocity of the hydrocarbon vapors to maintain the particles as a dense fluidized bed in said contact zone, withdrawing fouled catalyst particles from the bottom portion of said contact zone, mixing regenerating gas with the withdrawn fouled catalyst particles and passing the mixture through a perforated distribution plate in the bottom of a regeneration zone and into said regeneration zone wherein the particles are at least partially regenerated before being returned to said contact zone, selecting the velocity of the regenerating gas to maintain the particles as a dense fluidized bed in said regeneration zone above said distribution plate, withdrawing regenerated particles as a dense fluidized mixture from the bottom portion of the dense fluidized bed in said regeneration zone and passing them to said contact zone, removing regeneration gases containing entrained particles overhead from said regeneration zone, passing the removed regeneration gases first to a separation step to recover some of the entrained particles and then to an electrostatic precipitation step to separate and recover the fine particles from the regeneration gases, mixing regenerating gas with the separated and recovered fine particles from said electrostatic precipitation step unmixed with particles recovered in said first separation step and passing the resulting mixture into the bed of fluidized particles in said regeneration zone below the level of the bed but above the perforated distribution plate.

CHARLES E. JAHNIG.
CHARLES W. TYSON.

(References on following page)

REFERENCES CITED

The following references are of record in the file of this patent:

UNITED STATES PATENTS

| Number | Name | Date |
|---|---|---|
| 2,273,076 | Voorhees | Feb. 17, 1942 |
| 2,311,564 | Munday | Feb. 16, 1943 |
| 2,325,611 | Keranen | Aug. 3, 1943 |
| 2,326,705 | Thiele et al. | Aug. 10, 1943 |
| 2,327,175 | Conn | Aug. 17, 1943 |
| 2,325,136 | Kassel | July 27, 1943 |
| 2,340,878 | Holt et al. | Feb. 8, 1944 |
| 2,353,731 | Kanhofer | July 18, 1944 |
| 2,391,334 | Nicholson | Dec. 18, 1945 |

OTHER REFERENCES

"Producing Aviation Gasoline by Fluid Catalytic Cracking," pages R-252, R-254, National Petroleum News, June 2, 1943. (Copy in 196-52.2.)